United States Patent Office 3,652,733
Patented Mar. 28, 1972

3,652,733
CURABLE POLYMERS AS PLASTICIZERS
Noel Ernest Davenport, % W. R. Grace & Co.,
Cromwell Road, St. Neots, England
No Drawing. Filed Feb. 9, 1970, Ser. No. 10,032
Int. Cl. C08f 29/24, 45/38
U.S. Cl. 260—884                                4 Claims

ABSTRACT OF THE DISCLOSURE

Thermoplastic polymer compositions contain a plasticiser having addition-polymerisable double bonds and a polythiol. The compositions can be cured by exposure to free-radicals, and it is believed that the cured product is a polythioether. Preferably the thermoplastic polymer is vinyl chloride and the plasticiser diallyl phthalate. The compositions are useful for forming protective or decorative coatings.

---

This invention relates to plasticised thermoplastic polymer compositions.

Vinyl chloride polymers have excellent resistance to chemical attack and to abrasion, and are available in a wide range of colours. They are therefore well suited for use as a protective or decorative coating inter alia on steel. It is desirable to apply the vinyl chloride polymer in the form of a composition containing a plasticiser and the polymer, e.g. a plastisol or organosol, so that the steel or other surface may be coated or sprayed in situ. While it has been proposed to use polymerisable plasticisers, particularly diallyl phthalate and polyethylene glycol dimethacrylate, together with a free radical initiator such as t-butyl perbenzoate instead of (or in addition to) the conventional plasticisers such as dioctyl phthalate, the curing (polymerisation) of such plasticisers is difficult to control.

Diallyl phthalate, which is cheaper than polyethylene glycol dimethacrylate, requires a long polymerisation time which is a commercial disadvantage and increases the possibility of degradation of the vinyl chloride polymer. Also, if the plasticiser is incompletely cured it may be exuded from the coating.

The present invention provides plasticised thermoplastic compositions, which may be based on a vinyl chloride polymer or another thermoplastic polymer, and in which the above disadvantages are mitigated or eliminated. In the present specification the term "thermoplastic" will be applied both to polymers which are inherently so, and to polymers which can be rendered thermoplastic by incorporation of a plasticiser.

The compositions of the invention contain a thermoplastic polymer, a polymerisable plasticiser, e.g. diallyl phthalate, and a polythiol. They will normally contain 10–200 parts by weight of the polymerisable plasticiser per 100 parts by weight of the polymer.

The mechanism by which the compositions are cured is not certain, but may involve the reaction of the polythiol with the polymerisable plasticiser to produce thio-ether links. The curing reaction may be initiated in one or more of several ways, for example by oxygen, ultraviolet radiation, a chemical initiator or the use of high energy electrons or other particles or radiation. The compositions of the invention may therefore include additives appropriate to the desired mode of initiation, for example a photosensitising agent or peroxide initiator.

The plasticiser is "polymerisable" in the sense that it is capable of undergoing free-radical initiated homopolymerisation. The unsaturated groups in such a plasticiser are capable of reaction with a polythiol under appropiate conditions. Thus the plasticiser contains two or more carbon to carbon unsaturated -ene or -yne groups, i.e. the groups:

(1) —CH=CH—; (2) —C≡C—; (3) —CH=CH$_2$; (4) —C≡CH;
(5) —C=C—; (6) —C=CH; (7) —CH=C— and (8) —C=CH$_2$
    | |      |        |     |

Such groups are desirably terminal or near terminal in the molecule. The carbon to carbon unsaturated groups must not be conjugated, and are preferably well separated from each other in the molecule by other linkages. The plasticiser may contain an average of 2–5 such groups, but more usually the average will be 2–3 per molecule. Divinyl-terminated compounds such as diallyl esters and diesters of acrylic and methacrylic acid are suitable, diallyl phthalate being particularly preferred. Diallyl-terminated polymers e.g. diallyl-terminated polyesters may also be employed. Many of the "polyenes" described in our British specification No. 34,436/67 may be employed. British specification No. 34,436/67 is based on Kehr and Wsolek United States applications Ser. Nos. 567,841 filed July 26, 1966, and 617,801 filed Feb. 23, 1967, the disclosures of which are herein incorporated by reference.

In general, the molecular weight of the polymerisable plasticiser will be between 50 and 10,000, preferably between 200 and 5,000.

The polythiol can have two or more, e.g. 2–6, reactive —SH groups in the molecule, and a molecular weight of from 50 to 20,000. A preferred class of polythiol compounds is the esters of thioglycollic acid (HS—CH$_2$COOH); α-mercaptopropionic acid (HS—CH(CH$_3$)—COOH)

or β-mercaptopropionic acid (HS—CH$_2$CH$_2$COOH) with polyhydroxy compounds having two to six hydroxyl groups, preferably attached to the same or vicinal carbon atoms. The particularly preferred polythiols within this class are esters formed by reaction of the above sulphur-containing acids with aliphatic glycols, triols, tetrols, pentols or hexols. Specific examples of preferred polythiols are ethylene glycol bis(β-mercaptopropionate), trimethylolpropanetris - (β - mercaptopropionate), pentaerythritol-tetrakis-(β-mercaptopropionate) and thioglycollates such as pentaerythritol-tetrakis thioglycollate, as well as other polythiols disclosed in our British specification No. 34,436/67 based on Kehr and Wsolek U.S. applications Ser. No. 567,841 (filed July 26, 1966) and 617,801 (filed Feb. 23, 1967).

The ratio of polythiol to polymerisable plasticiser need not be the exact stoichiometric ratio calculated on the basis of one —SH group per carbon to carbon unsaturated group in the polymerisable plasticiser, but may be considerably more or less. Thus the ratio may be from 0.2 to 5 moles of thiol groups per carbon to carbon unsaturated group, but will most usually be from 0.5–1.5, and is preferably 0.9–1.1.

The thermoplastic polymer constituent of the composition may be, for example, a vinyl resin such as polyvinyl chloride, a copolymer of vinyl chloride with another vinyl monomer (especially vinyl acetate) polyvinyl acetate, or a copolymer of vinyl acetate with another vinyl monomer. Other kinds of thermoplastic polymer such as copolymers of alpha-olefins with vinyl monomers, e.g. of ethylene with vinyl acetate, may also be used. The invention is particularly valuable when the thermoplastic polymer is polyvinyl chloride. The polyvinyl chloride resin may be paste grade, or be a blend of paste and non-paste grade resins, to improve the stability to ageing and if it is to be applied as a plastisol, to reduce the viscosity thereof.

The compositions may also contain unpolymerisable plasticisers for the thermoplastic polymer, such as dioctyl phthalate, diisooctylphthalate, didecyl phthalate or dioctyl sebacate; they may also contain addition polymerisation inhibitors, diluents, solvents, pigments and/or dyes.

When a photosensitiser such as acetophenone or benzophenone is included in the composition, it will normally constitute about 0.05 to 2.5% by weight of the polymerisable plasticiser. A chemical free radical-initiator, if present, should constitute 0.05 to 5% of the polymerisable plasticiser. Suitable such initiators include organic peroxides, hydroperoxides, esters of peracids and azo compounds.

The compositions may include one or more heat stabilisers for the thermoplastic polymer. The amount to be employed is determined by consideration of the temperatures to which the composition must be heated for application, and the temperatures which will be encountered in use. Generally about 0.5 to 5% by weight of heat stabiliser, based on the thermoplastic polymer will be used. Suitable heat stabilisers include basic lead carbonate, lead acetate, lead stearate, lead oleate, calcium stearate, dibutyl tin dilaurate and barium-cadminum tin complexes.

The viscosity of a plastisol composition may be reduced if desired or necessary, e.g. to make it more suitable for application by spraying, dipping, spread coating, film casting or rotational or slush moulding, by adding a small percentage of a mineral spirit or of a viscosity depressant such as polyethylene glycol monolaurate. If a thin coating is required the composition may be formulated into an arganosol containing a diluent such as a toluene/xylene mixture.

The compositions of the invention may also take the form of a "dry blend," i.e. a blend containing insufficient plasticiser to produce a viscous liquid at room temperature which can be obtained by hot-mixing a granular polyvinyl chloride resin with the polymerisable plasticizer. The blend may be calendered, extruded or moulded.

The compositions can also take the form of a paste initially. If for example the polymer employed is an ethylenevinyl acetate copolymer the paste can be formulated to provide a solution of the polymer in the plasticiser on heating.

The compositions may be used to form protective or decorative coatings on metals, especially iron and steel, for example to a motor car roof, or other parts of motor car bodies. Plastics may also be coated. It is possible to obtain a simulated leather finish of pleasing appearance. Adhesion can often be improved by priming the metal before applying the composition. The composition is applied to the substrate and subsequently cured.

The compositions may also be used to produce self-supporting films or other shaped articles where a certain amount of rigidity is desired, by shaping and then curing by exposure to a free-radical generator.

The invention also provides a method of securing two surfaces together which comprises applying a thin layer of the composition to either or both surfaces and curing it by exposing it to a free radical generator.

When the compositions of the invention are formulated as plastisols or organosols, they should be fluxed (after application). The fluxing should be at between 100 and 200° C., the exact temperature depending on the nature of the composition and, if it is being applied as a coating, on the heat-resistance of the substrate. Generally it will be from 140 to 200° C. and preferably between 160° C. and 200° C. The time of fluxing will depend considerably on the temperature and composition and can vary from 10 seconds to 5 hours. The fluxed plastisol may then be cured by any of the methods previously mentioned, e.g. by exposure to ultra-violet radiation or a low dosage of high energy electrons. It will be appreciated that when such fluxing is performed the composition must not include a chemical initiator which would initiate the curing at any temperature up to the fluxing temperature.

The cured composition is believed to comprise a solid polythioether dispersed in a fluxed plastisol of a thermoplastic polymer, e.g. polyvinyl chloride, polyvinyl acetate or a copolymer of vinyl chloride with vinyl acetate, the weight ratio of polythioether to thermoplastic polymer being from 0.01 to 100:1, preferably 0.2–10:1.

The following examples illustrate the invention. "Parts" are by weight.

EXAMPLE 1

A plastisol of the following composition was prepared:

|  | Parts |
| --- | --- |
| "Breon 121"[1] | 100 |
| Diallyl phthalate | 50 |
| Pentaerythritol mercaptopropionate | 45 |
| Basic lead carbonate | 5 |
| Benzophenone | 0.5 |
| "Azosol Black MA" | 0.4 |

[1] Breon 121 is a polyvinyl chloride emulsion resin of nominal specific gravity 1.40, specific viscosity 0.63 to 0.69 in 0.5% solution in cyclohexanone, and K value 70 to 74.

The plastisol was prepared as follows:

The benzophenone was dissolved in the diallyl phthalate and the solution then added to the polyvinyl chloride. The basic lead carbonate and black dye were then added. The resulting mixture, which was in the form of a paste, was then de-gassed, and the pentaerythritol mercaptopropionate was stirred in under vacuum. The mixture was spread onto a steel plate to form a film 0.51 mm. thick and fluxed at 200° C. for three minutes.

The fluxed film was flexible, but on exposure to ultraviolet radiation for ten minutes became hard, tough and abrasion-resistant. It was insoluble in common organic solvents.

EXAMPLE 2

Following the procedure of Example 1, a plastisol was prepared with the following composition:

|  | Parts |
| --- | --- |
| "Breon 121" | 100 |
| Diallyl phthalate | 40 |
| Allyl-terminated polyester of molecular weight about 3,200[1] | 40 |
| Pentaerythritol mercaptopropionate | 44 |
| Basic lead carbonate | 5 |
| Benzophenone | 1 |

[1] The polyester was obtained by reacting a hydroxy-terminated polyester "Polyester Glycol RC-S 106" with two moles of allyl isocyanate.

A portion of this plastisol was cast on a steel surface into a film, fluxed, and cured as in Example 1. The cured film was tough and moderately rigid.

EXAMPLE 3

Following the procedure of Example 1, an organosol was prepared with the following composition:

|  | Parts |
| --- | --- |
| "Vinnol P100/70"[1] | 100 |
| Allyl-terminated polyester of molecular weight, 3000 | 50 |
| "Mellite 207" (a liquid calcium/zinc/epoxy stabiliser) | 4 |
| Isophorone | 16 |
| Mineral spirit | 32 |

[1] A polyvinyl chloride paste grade suspension resin of K value 68–72.

A portion of this plastisol was cast on steel into a film, fluxed and cured as in Example 1.

The film produced was tough, flexible and insoluble in common organic solvents.

EXAMPLE 4

The following composition was prepared:

| | Parts |
|---|---|
| "Geon 434"[1] | 100 |
| Diallyl phthalate | 165 |
| Pentaerythritol tetrakis thioglycollate | 150 |
| Benzophenone | 2.5 |

[1] "Geon 434" is a vinyl chloride-vinyl acetate copolymer suspension resin, having a specific viscosity of 0.31 to 0.36 in 0.5% solution in cyclohexanone and K value of 49–53.

The "Geon 434" was blended with the diallyl phthalate to form a smooth paste which was then heated until a molten solution was formed. The thiol and the benzophenone were then slowly stirred into the melt. A similar composition was also made containing 150 parts of "Geon 434." Both these compositions were liquid at elevated temperatures and solidified on cooling to room temperature. They could be cured by ultra-violet radiation in either the solid or molten form. The cured compositions were tough, flexible and non-tacky and did not melt when reheated after the curing. Other polymers can also be used in place of the Geon 434, in particular ethylene-vinyl acetate copolymers. The resulting compositions are of a similar nature to those described in Examples 1–3 except that a smaller amount of the polymer is used and the composition is heated so that the polymer dissolves in the plasticiser.

While the invention has been described with particular reference to the production of coatings, the compositions of the invention can be applied generally to the ordinary uses of thermoplastic compositions.

I claim:

1. Compositions comprising (a) a polymerisable plasticiser having an average of 2–5 non-conjugated carbon-to-carbon unsaturated groups per molecule, (b) a thermoplastic polymer selected from the group consisting of polyvinyl chloride and copolymers of vinyl chloride with vinyl acetate, the weight ratio component (a) to (b) being from 0.1:1 to 2:1, and (c) an ester of thioglycollic acid, $\alpha$-mercaptopropionic acid or $\beta$-mercaptopropionic acid with an aliphatic polyhydroxy compound having 2 to 6 hydroxy groups, the molar ratio of thiol groups in the thiol-containing ester to carbon-to-carbon unsaturated groups in the polymerisable plasticiser being from 0.2:1 to 5:1.

2. Compositions according to claim 1 wherein the molar ratio is 0.5–1.5:1.

3. Compositions according to claim 1 wherein the polymerisable plasticiser is diallyl phthalate.

4. Compositions according to claim 1 which contain also an additive selected from the group consisting of addition polymerisation inhibitors, photosensitizers and unploymerisable plasticisers.

References Cited

UNITED STATES PATENTS

| 3,496,253 | 2/1970 | Hamilton et al. | 260—884 |
| 3,359,193 | 12/1967 | Pinner | 204—159.17 |
| 3,468,855 | 9/1969 | Hunter | 260—79.3 |

MURRAY TILLMAN, Primary Examiner

H. W. ROBERTS, Assistant Examiner

U.S. Cl. X.R.

117—132 B, 161 UZ; 156—332, 333; 204—159.15, 159.17, 159.18; 260—23 XA, 31.86, 45.75 RK, 79.5 C, 875, 878, 899